Nov. 13, 1923.　　　　J. MATHEUS ET AL　　　　1,473,792
EGG TURNER
Filed May 7, 1923
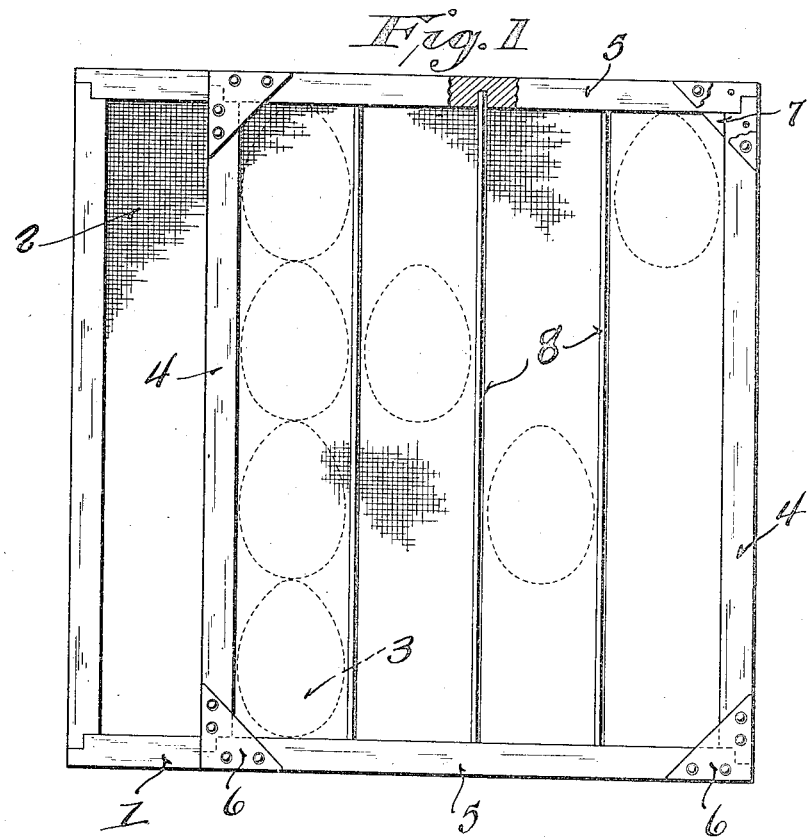
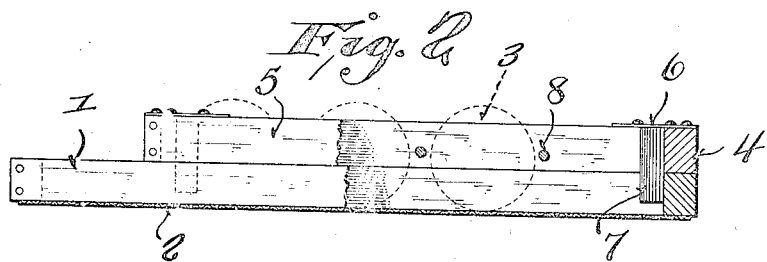

Patented Nov. 13, 1923.

1,473,792

UNITED STATES PATENT OFFICE.

JOHN MATHEUS AND HERBERT SCHEDDIN, OF MILWAUKEE, WISCONSIN.

EGG TURNER.

Application filed May 7, 1923. Serial No. 637,124.

*To all whom it may concern:*

Be it known that we, JOHN MATHEUS and HERBERT SCHEDDIN, both citizens of the United States, and residents of Milwaukee, in the county of Milwaukee and State of Wisconsin, have invented certain new and useful Improvements in Egg Turners; and we do hereby declare that the following is a full, clear, and exact description thereof.

This invention relates to egg turning device for incubators.

In incubators it is necessary to turn the eggs at frequent intervals. It is laborious to turn the eggs by hand and it also necessitates the opening of the incubator for a material length of time.

This invention is designed to overcome the above noted defects.

Objects of such invention are to provide an egg turner which will cooperate with the trays of the incubator in a manner to simultaneously turn the eggs when such device is manipulated and to provide a device of this type which may be made in a sturdy and rugged manner and which is extremely cheap in its construction.

An embodiment of the invention is shown in the accompanying drawing, in which—

Figure 1 is a plan view of the device in a position upon an egg tray.

Figure 2 is a side elevation of the structure shown in Figure 1 with the parts broken away to more clearly illustrate the construction.

The egg trays, as usually provided in incubators, comprise side members 1, and a mesh floor or bottom 2 upon which the eggs 3 are adapted to rest.

The egg turner comprises a rectangular frame having end portions 4 and side portions 5, such latter being of a lesser extent than the side portions of the egg tray. These walls are braced by triangular corner members 6, as indicated, and at each of the corners are provided with downwardly projecting lugs 7 rigidly secured to the egg turner and projecting into the egg tray, as may be clearly seen on Figure 2.

A plurality of transverse rods 8 are socketed in the side members 5 of the egg turner and are spaced apart a distance slightly greater than the smaller dimension of the eggs.

The operation of the apparatus is as follows: The eggs are positioned between the rods 8 and rest upon the bottom 2 of the egg tray. When it is desired to turn the eggs, it is merely necessary to slide the egg turner to the left in Figure 1 thereby giving the eggs a partial rotation. The next turning operation is accomplished by merely sliding the egg turner to the right, thereby repositioning the eggs.

It is a frequent occurrence in incubator practice that eggs spoil and are soon found to be defective when candled or otherwise examined. It, therefore, may be advantageous to provide an extra row of eggs between the end 4 of the egg turner and the end of the tray. These eggs, of course, will have to be removed at the first turning operation and replaced, but this row of eggs will soon disappear due to defective eggs and due to the replacing of defective eggs by using the eggs in this row.

It will thus be seen that an egg turner has been provided which is of extremely simple construction, which is readily and quickly manipulated and which may be advantageously employed in the usual types of incubators without necessitating any change in its details of construction.

We claim:

The combination of an incubator egg tray having side bars, of an egg turner having side members adapted to slide upon said side bars, downwardly projecting lugs carried by said members and slidably engaging the inner faces of said side bars, and a plurality of transverse members carried by said members and spaced apart a distance to accommodate the eggs, whereby said turner may be slid across said tray to give the eggs a partial rotary motion.

In testimony that we claim the foregoing we have hereunto set our hands at Milwaukee, in the county of Milwaukee and State of Wisconsin.

JOHN MATHEUS.
HERBERT SCHEDDIN.